United States Patent
Ball et al.

(10) Patent No.: US 10,399,897 B2
(45) Date of Patent: Sep. 3, 2019

(54) CEMENTITIOUS BINDERS, ACTIVATORS AND METHODS FOR MAKING CONCRETE

(71) Applicant: David Ball Group Plc, Cambridge, Cambridgeshire (GB)

(72) Inventors: David Martin James Ball, Bury St. Edmunds (GB); Martin Liska, Cambridge (GB); Peter Hewlett, Rickmansworth (GB)

(73) Assignee: DAVID BALL GROUP PLC, Cambridge, Cambridgeshire (GB)

(*) Notice: Subject to any disclaimer, the term of this patent is extended or adjusted under 35 U.S.C. 154(b) by 123 days.

(21) Appl. No.: 14/404,541

(22) PCT Filed: May 31, 2013

(86) PCT No.: PCT/GB2013/051467
§ 371 (c)(1),
(2) Date: Nov. 28, 2014

(87) PCT Pub. No.: WO2013/179065
PCT Pub. Date: Dec. 5, 2013

(65) Prior Publication Data
US 2015/0107491 A1    Apr. 23, 2015

(30) Foreign Application Priority Data

| Jun. 1, 2012 | (GB) | ................................. 1209865.3 |
| Jun. 1, 2012 | (GB) | ................................. 1209867.9 |
| Jul. 16, 2012 | (WO) | ............... PCT/GB2012/051699 |

(51) Int. Cl.
| C04B 14/00 | (2006.01) |
| C04B 18/06 | (2006.01) |
| C04B 7/17 | (2006.01) |
| C04B 28/08 | (2006.01) |
| C04B 28/02 | (2006.01) |
| C04B 7/153 | (2006.01) |
| C04B 7/28 | (2006.01) |
| C04B 7/00 | (2006.01) |
| C04B 7/34 | (2006.01) |
| C04B 28/00 | (2006.01) |
| C04B 32/00 | (2006.01) |
| C04B 103/10 | (2006.01) |
| C04B 111/10 | (2006.01) |
| C04B 103/32 | (2006.01) |

(52) U.S. Cl.
CPC .............. *C04B 7/17* (2013.01); *C04B 7/1535* (2013.01); *C04B 7/28* (2013.01); *C04B 28/021* (2013.01); *C04B 28/08* (2013.01); *C04B 2103/10* (2013.01); *C04B 2103/32* (2013.01); *C04B 2111/1037* (2013.01); *Y02P 40/143* (2015.11); *Y02W 30/92* (2015.05); *Y02W 30/94* (2015.05)

(58) Field of Classification Search
CPC .............. C04B 7/17; C04B 7/28; C04B 28/08
See application file for complete search history.

(56) References Cited

U.S. PATENT DOCUMENTS

| 4,391,645 A * | 7/1983 | Marcellis ................ C04B 28/02 106/809 |
| 4,496,267 A | 1/1985 | Gnadeinger |
| 4,715,896 A | 12/1987 | Berry |
| 4,933,013 A | 6/1990 | Sakai et al. |
| 6,409,820 B1 | 6/2002 | Novak |
| 7,347,896 B2 | 3/2008 | Harrison |
| 7,875,231 B1 | 1/2011 | Bracegirdle |
| 7,909,927 B2 * | 3/2011 | Margheritis ............ C04B 28/02 106/205.1 |
| 8,070,876 B1 * | 12/2011 | Jiang .................... C04B 20/1033 106/638 |
| 2003/0041785 A1 | 3/2003 | Harrison |
| 2008/0057206 A1 | 3/2008 | Igo et al. |
| 2011/0281241 A1 | 11/2011 | Pandolfelli et al. |

FOREIGN PATENT DOCUMENTS

| AU | 200168775 B2 | 3/2003 |
| CA | 2324486 A1 | 10/2000 |
| CN | 102775085 | 11/2012 |
| EP | 1254083 B1 | 8/2011 |
| EP | 2371783 | 10/2011 |
| EP | 2508496 | 10/2012 |
| GB | 813084 | 2/1957 |
| JP | 59-30748 A | 2/1984 |
| JP | 63-5806 A | 1/1988 |
| JP | 2006-193367 A | 7/2006 |
| JP | 2007-261884 A | 10/2007 |
| JP | 2008189486 A | 8/2008 |
| KR | 1020110048756 | 5/2011 |
| KR | 10-1140561 B1 | 5/2012 |
| KR | 101140564 B1 * | 5/2012 |
| MY | 141706 | 6/2010 |
| RU | 2289551 C1 | 12/2006 |
| RU | 2408551 C1 | 1/2011 |
| RU | 2434820 C1 | 11/2011 |
| UA | 31387 | 4/2008 |
| WO | 03/070657 A1 | 8/2003 |
| WO | 2010079414 | 7/2010 |
| WO | 2012072450 | 6/2012 |
| WO | 2014/166875 | 10/2014 |

OTHER PUBLICATIONS

Machine Translation into English for KR 101140561 (Lee). May 2, 2012.*

(Continued)

*Primary Examiner* — James E McDonough
(74) *Attorney, Agent, or Firm* — Hamre, Schumann, Mueller & Larson, P.C.

(57) ABSTRACT

A cementitious binder comprises at least 90% by weight of a hydraulically-active material comprising ground granulated blast furnace slag (GGBS) and/or pulverised fuel ash (PFA), and at least 0.1% by weight of CaO in an activator composition for the hydraulically-active material. The cementitious binder does not comprise any Portland cement and is, therefore, more environmentally friendly. The binder further comprises a superplasticiser such as a polycarboxylate ether (PCE). A concrete, mortar, grout, screed or render may be formed from a mixture of the cementitious binder, aggregate particles, water and superplasticiser.

15 Claims, No Drawings

(56) References Cited

OTHER PUBLICATIONS

Regular Translation inito English for KR 101140561 (Lee). May 2, 2012.*
"Ground Granulated Blast-Furnace Slag as a Cementitious Constituent in Concrete", Reported by the ACI Committee 233, ACI 233R-95, reapproved 2000, 18 pages.
Vavro et al. "Alkali-Activated Building Materials Based on Blast Furnace Slag and Non-Standard Aggregates", Transactions of the VŠB—Technical University of Ostrava, No. 2, 2011, vol. XI, Civil Engineering Series, paper #35, 8 pages.
International Search Report (PCT/ISA/210) for PCT/GB2012/051699 (dated Oct. 26, 2012); 4 pages.
Written Opinion (PCT/ISA/237) for PCT/GB2012/051699 (dated Oct. 26, 2012); 8 pages.
Examination and Search Report for GB1112291.8 (dated May 21, 2012); 3 pages.
Examination and Search Report for GB 1321035.6 (dated Dec. 30, 2013); 3 pages.
International Search Report (PCT/ISA/210) for PCT/GB2013/051467 (dated Sep. 19, 2013); 4 pages.
Written Opinion (PCT/ISA/237) for PCT/GB2013/051467 (dated Sep. 19, 2013); 8 pages.
Examination Report issued in GB1501173.7 dated Aug. 30, 2015 (6 pages).
Canadian Office Action, dated Mar. 29, 2019 (Mar. 29, 2019), for related Canadian Application No. 2,875,134 (6 pages).
Non-final Office Action, issued in the related U.S. Appl. No. 15/792,932, dated Apr. 24, 2019, 17 pages.

* cited by examiner

CEMENTITIOUS BINDERS, ACTIVATORS AND METHODS FOR MAKING CONCRETE

The invention relates to activator compositions for combination with non-OPC hydraulically-active (or more correctly, latently hydraulically-active) materials such as ground granulated blastfurnace slag (GGBS) to form cementitious binders, methods of forming cementitious binders, and methods of forming concretes, mortars, grouts and renders. The invention also relates to cementitious binders that do not contain OPC and concretes, mortars, grouts and renders that do not contain OPC.

BACKGROUND

Concretes and other related materials such as mortars, grouts and renders are typically formed by combining an aggregate material, such as sand and gravel, with a cementitious binder (cement). The most common cement used in the world today is Ordinary Portland cement (OPC). OPC is a finely-ground material containing at least two thirds by mass calcium silicate phases, with the majority of the remainder being made of aluminium, iron and magnesium based phases. When a mixture of OPC and an aggregate is further combined with water, a hydration reaction occurs and the mixture solidifies.

OPC has many benefits as a binder in concretes and related materials. Concretes produced using OPC are quick to set and cure to a high compressive strength. The raw materials for the manufacture of OPC are readily available and the cement itself is relatively cheap. Other cementitious materials, such as pozzolans or blastfurnace slags, may produce structures with final strength or environmental durability, but the setting and curing of such materials tends to be inferior in comparison with OPC based materials. Thus, conventional cement compositions comprise a proportion of OPC even if other cementitious materials are also used.

In recent years, the environmental impact of various industrial processes has become a great global concern. The production of OPC is a highly energy intensive process that involves various raw materials being heated in a kiln to temperatures greater than 1500° C., cooled, and then ground to a fine powder. It is estimated that about one tonne of carbon dioxide is released, as a result of chemical reactions that occur during heating and due to the combustion of fuels (1.6 GJ/tonne), for every tonne of OPC produced.

One cementitious material often used to replace a portion of OPC in concretes is ground granulated blastfurnace slag (GGBS). GGBS may be described as a non-OPC latently-hydraulically-active material. When iron ore has the iron taken out of it in a blast furnace, the non-metallic product consisting essentially of silicates and alumino-silicates of calcium becomes available to form a cementitious binding material. In the production of iron, a blast furnace is continuously charged from the top with iron oxide (ore pellets, sinter etc) and a fluxing stone comprising of limestone and dolomite together with coking fuel. Two products are obtained from the furnace; molten iron that collects as a pool in the bottom of the furnace and liquid iron-blast-furnace slag floating on the pool of iron. Both products are periodically tapped from the furnace at temperatures of about 1500° C.

To maximise the hydraulic potential of GGBS, molten slag must be chilled rapidly as it leaves the blast furnace. Rapid quenching or chilling minimises crystallisation and converts the molten slag into fine glassy aggregate-sized granules having dimensions generally smaller than 5 mm. These granules of slag are then ground to a fine powder to form GGBS. As GGBS is a by-product of the iron industry, it has a much lower carbon footprint than OPC (i.e. 0.055 tonnes $CO_2$ per tonne of GGBS vs. ~1 tonne of $CO_2$ per tonne of OPC). Thus, the amount of carbon dioxide released per tonne of concrete can be reduced if a proportion of GGBS is used in conjunction with OPC as a binder. Typically, GGBS cannot replace greater than 70% of the weight of OPC to form a viable binder for a concrete or mortar. It would be desirable to eliminate the OPC altogether, but GGBS requires an activator in order to function as a hydraulic material.

The use of GGBS as a cementitious material has been known for many years and appears to date back to 1774 when Loriot made a mortar using GGBS in combination with slaked lime. The slaked lime was used as an activator. While cementitious binders formed from GGBS activated with lime may have useful properties, the set times and strength gain times are longer compared with an OPC equivalent.

The use of GGBS in conjunction with chemical stimulants such as alkalis is therefore known, but the skilled person's understanding is that such concretes have limitations in relation to setting times, strength and temperature response. This has prevented their widespread adoption. Concretes are specified and used according to established national standards, codes etc. Whilst such documents may acknowledge GGBS-based concretes they are not at the forefront of use. OPC concretes are in widespread use, are competitive and functionally adequate.

The skilled person's current understanding, or prejudice, is that the higher the GGBS content the more limited the mechanical properties of the resulting concretes, even using OPC as the activator for GGBS. Further, concretes have to satisfy certain standards e.g., in the UK, BS 4246 where minimum strengths against time have to be achieved. Thus, despite its environmental impact, OPC continues to be used.

SUMMARY OF INVENTION

In its various aspects, the invention provides activator compositions for combining with hydraulically-active materials comprising ground granulated blastfurnace slag (GGBS) and/or pulverised fuel ash (PFA) to form a cementitious binder, methods for using such activator compositions, methods of forming cementitious binders, cementitious binders, methods of forming concretes, mortars, grouts or renders, and concretes, mortars, grouts or renders, as defined in the appended independent claims to which reference should now be made. Preferred or advantageous features of the various aspects of the invention are set out in dependent sub-claims.

It is known in the prior art, such as from Loriot mentioned above, and patent application WO 03/070657, to combine GGBS and lime to form a cementitious binder. WO 03/070657 mainly describes use of gypsum as a hydraulically-active material but gives, by way of comparison, results of an experiment using 10% lime as an activator mixed with 90% GGBS to form a cementitious binder.

Measured values for the strength of this mixture (binder) after 0, 2, 7, 28 and 33 days are set out in Table II of WO 03/070657, and are very much lower than for any of the binders described in WO 03/070657 incorporating gypsum. This prior art thus reinforces the view that more than 10% lime must be used as an activator in GGBS to achieve acceptable strength in an acceptable time.

In the prior art, therefore, a high proportion of lime has been used (greater than 10 wt %), and a concrete prepared using such a binder has a low initial strength and a slow setting time. During experiments to find a suitable activator to combine with GGBS to form a viable cementitious binder, the present inventors tried combining GGBS with 10 wt % hydrated lime. The properties of concrete cubes produced with this binder were acceptable, but the set time was undesirably extended. The set time, or time of set, is a standard measurement for concretes and mortars and is defined by a point in time at which penetration resistance reaches certain values. Concrete compositions can be defined in terms of initial set times and final set times. Set times can vary depending on temperature.

The inventors have now determined that improved concretes can be prepared using a cementitious binder comprising a high proportion of GGBS and/or PFA and a low proportion of CaO, or lime, as described herein.

In a preferred implementation of the invention, the inventors have found that the strength and usability of non-OPC binders of this type may be improved further by combining CaO, or lime, and a dispersant, preferably of a particular type namely a superplasticiser. A particularly preferred type of superplasticiser for use in the present aspect of the invention is a polycarboxylate-ether-based (PCE) dispersant.

Dispersants, also termed water-reducers or plasticisers or fluidifiers, are materials or compounds added to binders to reduce the required water/binder ratio, and a superplasticiser (or high-range water-reducer), such as a PCE, is a particularly efficacious dispersant. A superplasticiser such as a PCE may be capable of reducing the water/binder ratio, relative to a control sample of binder which gives adequate performance using only water, by more than 15% or 25% without reducing the workability of the binder before setting. In this document, superplasticisers, including PCEs, are also referred to as fluidifiers or extreme fluidifiers.

In other words, a dispersant or fluidifier is a concrete admixture which achieves a given concrete workability level with substantially lower water content when compared to the case where the admixture is not used. Preferably, the dispersant or fluidifier used in aspects of the present invention may be capable of reducing the water content by at least 30%. An example may be a polycarboxylate-ether-based superplasticiser as described above. It is preferable that the fluidifier is a superfluidifier or a superplasticiser or high-range water reducer.

In a preferred implementation, the invention may thus provide a binder comprising CaO, or lime, one or more superplasticisers or PCEs, and a hydraulically-active material comprising GGBS and/or PFA. This implementation of the invention may also provide an activator composition comprising, or consisting of, the CaO and the superplasticiser or PCE, for mixing with the hydraulically-active material. The activator composition is a composition, preferably in powder or powdered form, mixable with hydraulically-active material and other components such as water, and optionally a fluidifier (which may be a further fluidifier, in addition to any superplasticiser in the activator composition), to form a binder.

PCEs are available in powder or liquid form. Either may be usable in embodiments of the invention but a powdered form of PCE should preferably be used if combined with CaO (also usually in powdered form) to form an activator. If PCE in liquid form is used, then the activator may comprise the CaO and the PCE may be added separately on mixing the binder.

The activator composition may or may not comprise materials other than the CaO and/or superplasticiser, such as pulverised fuel ash (PFA), preferably superfine PFA, and/or microsilica, as described in more detail below. The resulting binder composition may therefore also comprise these materials.

The inventors' understanding is that when an activator comprising CaO is used without the addition of a superplasticiser, or PCE, and in particular when the binder comprises less than 10%, or less than 9.5%, CaO, hydration products do form in the system. But, at early age (say within 7-14 days) the extent to which they form is limited and so is, therefore, the formation of a well-ramified strength-providing network of such hydration products. Consequently, the achieved compressive strength may be insufficient, or may form insufficiently rapidly, for practical applications. The inventors have found that this problem may be solved by the use of a dispersant or fluidifier (such as a superplasticiser or a PCE) which enables the reduction of the quantity of mixing water used.

Current knowledge classifies fluidifiers as dispersing admixtures which, after adsorbing onto surfaces of cement grains, repel those grains from each other due to the intrinsic chemical properties of the admixtures, causing deflocculation and substantially increased fluidity of the entire mix. Hence they allow for the use of smaller amounts of water in a binder to achieve the same rheological properties. Furthermore, the individual grains are more exposed to water and hydrate more rapidly and, due to the repelling action, the fluidity of the mix is greatly improved. Another currently-recognised effect of fluidifiers is the fact that by reducing the water content the amount of free water (not used by the hydration and therefore creating voids) within the hardened concrete is reduced, which results in the reduction of the porosity. The inventors consider (though this is not certain at present and does not limit the present invention) that addition of a PCE reduces the interparticle distances, allowing for early formation of chemical bonds amongst the hydration products.

The fluidifier (superplasticiser) in the system may be introduced either in a powder or liquid form or in a combined form. In case of the former, it may be pre-blended with the other solid components, optionally being provided as a component of the activator composition to form the binder. In case of the latter, the liquid fluidifier may be added during batching of the concrete (or binder). In case both the forms are used, the solid form may be part of the binder and the liquid form may be added during the batching process.

The resulting binder may then be mixed with aggregates in a conventional way to produce concrete (or used to produce other products such as mortars, grouts and renders).

The system may advantageously differ from prior-art non-OPC systems in the way that it achieves a much more rapid strength development as well as the magnitude of strength at a given time period, even when compared to conventional OPC-based mixes with a similar GGBS content. In addition, the inventors' experiments indicate that the resulting concrete may advantageously exhibit improved resistance to acid and sulphate attacks, and improved resistance to the penetration of chloride ion. The colour of the system, if of importance, can be tailored to the required need from off-white to dark grey.

The advantageous effect of superplasticisers, and particularly PCEs, in combination with an alkaline activator for non-OPC binders is particularly surprising as the skilled person's current understanding is that superplasticisers are not effective, or are denatured, in such alkaline conditions.

In non-OPC binders, for example based on GGBS, in order to generate adequate strength rapidly, strongly alkaline activators such as NaOH have typically been used. It is known that such activators damage, or denature, superplasticisers such as PCEs. The inventors have solved this problem by using a less strongly alkaline activator, CaO. CaO by itself may be less effective than NaOH as an activator for, for example, GGBS. But the inventors' surprising solution to this problem is based on their recognition that addition of a superplasticiser not only affects the amount of water required for a binder, and its rheological properties, but also the rate of strength formation in a hydraulically-active material. Using a less alkaline, and less effective alkali activator (i.e. CaO rather than NaOH) is at first sight a backward step, but the lower alkalinity enables use of a superplasticiser, and in particular a PCE, which surprisingly enables CaO to become a more effective activator than NaOH or other more strongly alkaline activators.

In the description above, the invention is described primarily in the context of GGBS as the hydraulically-active, or latently-hydraulically-active material. The inventors have found, however, that binders and other products embodying the invention may comprise PFA, or may comprise a mixture of GGBS and PFA, or (in less-preferred embodiments) mixtures of GGBS, PFA and/or materials such as other suitable pozzolans or such as inert (e.g. filler) materials. 100% GGBS or 100% PFA may be used, or any mixture between the two, but the inventors have found that GGBS mixed with between 20% and 60%, or preferably between 30% and 50%, or 35% and 45%, PFA gives an effective binder with particularly-good strength levels. The inventors' preferred mix to maximise strength is GGBS:PFA in a ratio of about 60:40 or 55:40 by weight.

Wherever appropriate, reference throughout this document to embodiments of the invention describing use of GGBS, should therefore be construed so as to include, or incorporate, GGBS, PFA, and/or the mixtures described above.

In preferred embodiments, the invention may thus provide any method or material for implementing the formation or use of a binder comprising; a latently-hydraulically-active material comprising a material selected from the group consisting of GGBS, PFA, and mixtures of GGBS and PFA: less than 10%, or 9.5%, CaO or lime; and a superplasticiser, preferably a PCE. The binder may be usable for example for a concrete, a mortar, a grout, or a render.

In one embodiment, an activator composition comprising the CaO or lime and the superplasticiser may be mixed with the latently-hydraulically-active material. Alternatively an activator composition may comprise only CaO or lime, and the superplasticiser may be added separately.

Preferably, the method produces a binder comprising more than 0.1%, 0.5%, 1% or 2% and/or less than 9.5% or 5% or 4% CaO or lime (by weight), and particularly preferably about 3%. Preferably, the method produces a binder comprising more than 0.25% or 0.35% or 0.5%, and/or less than 1% or 2% superplasticiser or PCE, by weight.

Particularly preferably, for a superplasticiser or PCE in powdered form the method produces a binder comprising more than 0.25% or 0.35%, and/or less than 0.75% or 1% superplasticiser or PCE, and particularly preferably 0.5%, by weight.

Particularly preferably, for a superplasticiser or PCE in liquid form the method produces a binder comprising more than 0.5% and/or less than 2% superplasticiser or PCE, by weight.

Preferably the balance of the weight of the binder, other than the CaO or lime and the superplasticiser or PCE, consists of the latently-hydraulically-active material. The latently-hydraulically-active material preferably comprises GGBS, PFA or a mixture of GGBS and PFA as described above, and preferably comprises only this material, but it may comprise other materials which are either inert or are other pozzolanic materials. However, the GGBS, PFA or mixture of GGBS and PFA preferably makes up more than 50%, 70%, 80% or 90% of the weight of the hydraulically-active component of the binder (i.e. of the balance of the weight of the binder, other than the CaO or lime and the superplasticisers or PCE).

References in this document to the quantity of GGBS, or of GGBS and/or PFA, in a binder or other product should be construed on this basis. For example a reference to a binder comprising a certain quantity of GGBS therefore includes a reference to a binder comprising that quantity of a hydraulically-active material consisting of a mixture of at least 50%, 70%, 80% or 90% GGBS with inert or pozzolanic materials as described above.

VARIOUS ASPECTS OF THE INVENTION

In a first aspect, the invention may thus provide a cementitious binder comprising GGBS and/or PFA, preferably in an amount of 90% or more, and at least 0.1% by weight of CaO. The CaO may be any CaO, or lime, suitable for triggering and accelerating the hydration of the GGBS and/or PFA. The cementitious binder may contain 0.2 wt % CaO, or 0.3 wt % CaO, or 0.5 wt % CaO, or 1 wt % CaO or 1.5 wt % CaO, or more than 0.2, 0.3, 0.5, 1 or 1.5 wt % CaO.

The cementitious binder may comprise at least 90% or 91% by weight GGBS and/or PFA with the remainder comprising the CaO and PCE.

The weight ratio of CaO to GGBS and/or PFA, or hydraulically-active material, in the cementitious binder may be greater than 0.1:99.9. For example the ratio may be greater than 0.5:99.5, for example equal to or greater than 1:99 or 1.5:98.5, for example equal to or greater than about 2:98, or 3:97, or 4:96, or 5:95, or 6:94, or 7:93, or 8:92, up to 9:91.

The binder may optionally consist of only the GGBS and/or PFA, the CaO and the PCE. In other words, the activator composition may consist of the CaO and the PCE (preferably in powder form). Alternatively, an activator composition may comprise another component, providing that the CaO forms at least 0.1 wt %, 0.5 wt % or at least 1.5 wt % of the binder. The ratio of CaO to GGBS and/or PFA in the cementitious binder may be greater than 1.5:98.5, for example equal to or greater than about 2:98, or 3:97, or 4:96, or 5:95, or 6:94, or 7:93, or 8:92 up to 9:91, providing that the cementitious binder comprises at least 0.1 wt % of CaO.

In some embodiments a cementitious binder may comprise between 0.1 wt % and 9.5 wt % CaO, preferably between 0.5 wt % and 5 wt % CaO, and particularly preferably between 1.5 wt % and 4 wt % CaO.

Unless otherwise specified, reference herein to an activator composition (or activation composition) may include reference to an activator composition or an activator that solely consists of CaO or lime (with PCE or other superplasticiser added to the binder separately), to an activator composition or an activator that comprises CaO or lime and one or more other components (with PCE or other superplasticiser added separately), to an activator composition or an activator that comprises CaO or lime and PCE or other superplasticiser, preferably as powders blended together, and/or to an activator composition or an activator that comprises CaO or lime, PCE or other superplasticiser and one or more other components.

GGBS is a material produced in a blastfurnace during the production of iron and is an example of a latently-hydraulically-active material that can be used as a component of a cementitious binder. The chemical composition of a particular GGBS will depend on the composition of the ore fed into the blast furnace, and as a consequence, the composition of GGBS may vary. On analysis, a typical GGBS has a composition having approximately 30-50 wt % CaO, 28-38 wt % $SiO_2$, 8-24 wt % $Al_2O_3$, 1-18 wt % MgO, 1-2.5 wt % $SO_3$, and 1-3 wt % $Fe_2O_3$ and MnO. It is thought that all compositions of GGBS may be suitable for use with CaO, or an activator composition comprising CaO, as described and defined herein. In preferred embodiments of the invention, GGBS meeting a predetermined standard such as BS (British Standard) EN 15167 may be used. GGBS is a widely-used component of many commercially-available concrete pre-mixes OPC-containing, where it replaces a proportion of ordinary Portland cement (OPC). It is preferred, however, that the cementitious binders of the present invention do not contain any OPC and contain a very high proportion of GGBS.

Limes are a class of materials mainly consisting of calcium oxide. They may be highly-pure limes that have a high proportion of calcium-based components, or there may be a proportion of impurities such as magnesium oxides. The composition may vary depending on the source of limestone used to produce the lime. For example, quicklime may be defined as calcium oxide, a major part of which is, but not exclusively so, calcium oxide or calcium oxide in association with magnesium oxide, capable of slaking with water. Quicklime exists with a range of reactivities, from dead burned (less reactive) to reactive. It is preferred that any quicklime used in the invention has a high reactivity.

References in this document to CaO as a component of an activator composition include reference to commercially available lime primarily containing CaO but which may also contain substances such as MgO, and calcium and magnesium hydroxides. Lime for use in embodiments of the invention preferably contains more than 80% or 90% or 95% CaO.

Preferably, the proportion of activator composition used in embodiments of the invention is less than 8 wt % of the total weight of the cementitious binder, preferably less than 5 wt %, or less than 4 wt %, or less than 3 wt %, and/or more than 0.5 wt %, or 1 wt %. Such activator compositions may comprise CaO, and optionally superplasticiser, or PCE, in combination with additional low concentrations of microsilica and/or pulverised fuel ash (ideally in super-fine form). The use of such an activator composition thus provides a cementitious binder comprising GGBS and/or PFA, and a low concentration of CaO.

Preferably between 4-6 wt % of an activator composition is used, but optimally about 5 wt %.

The cementitious binder may comprise greater than 93% or 95% or 96% by weight GGBS and/or PFA, and/or less than 99% or 98% or 97% or 96% GGBS and/or PFA.

In embodiments of the invention, the low weight percentage of activator composition or activator in the slag is innovative, as prior-art lime-activated GGBS cementitious binders would typically comprise at least 15 wt % lime, and not in practice, as low as 10 wt % lime, because such levels have been considered too low to produce effective binders. The skilled person would not appreciate that it was possible to use cementitious binders comprising greater than 90 wt % GGBS to produce a practically-applicable concrete. Furthermore, it appears that in addition to the use of CaO and superplasticiser, or PCE, the inclusion of a proportion of microsilica and/or superfine pfa in the activator composition may advantageously allow an even lower overall proportion of activator composition to be used. By using an activator composition embodying the present invention, cementitious binders containing a high proportion of GGBS may be formed, while the setting times remain within a range that may be deemed commercially acceptable, i.e. less than 18 hours at a temperature of about 20° C. Preferably the initial set times at 20° C. are less than 14 hours, preferably less than 12 hours or less than 10 hours. Particularly preferably the initial set times are less than 8 hours.

A cementitious binder may comprise between 94-97 wt % ground granulated blastfurnace slag (GGBS) and/or PFA, between 2-3.5 wt % of the CaO and 0.25% to 0.75% superplasticiser or PCE as mentioned, and between 1-2.5 wt % microsilica or super-fine PFA. Particularly preferably the binder may comprise between 2.5-3.25 wt % of the CaO, 0.4% to 0.6% superplasticiser or PCE as mentioned, and between 1.25-2 wt % microsilica and/or super-fine PFA. The activator composition may comprise CaO, superplasticiser or PCE, and microsilica and/or super-fine PFA in these proportions.

Microsilica or silica fume is a by-product of ferrosilicon or elemental silicon production and is a fine vitreous particle having a particle size that is far smaller than an average cement particle. Preferably, the microsilica has a composition comprising greater than 80 wt % $SiO_2$, a density of between 2.20-2.40 g/cm$^3$ and an average particle size of between 0.1 and 0.2 micrometers. The silica fume should preferably be in a readily dispersible form.

Pulverised fuel ash (PFA) is a particulate material derived from coal-fired power stations, consisting primarily of calcium aluminosilicates. Superfine PFA is a finer fraction of PFA. The typical particle size range of superfine PFA is slightly coarser than the typical particle size range for microsilica. PFA may be added to CaO or lime to form the activator composition in combination with microsilica as the second component of the activator composition or instead of microsilica.

In a further aspect of the invention, as outlined above, a cementitious binder as described herein may advantageously be used in combination with fluidifying agents or superfluidifying agents such as polycarboxylate ethers (PCEs) (in fluid or powder form) to form a concrete. A cementitious binder comprising a high proportion of GGBS and/or PFA and a low proportion of CaO, when combined with fluidifying agents, may provide a workable mix with an extremely-low water to binder ratio. The inventors' preliminary understanding (which does not form part of the claimed invention) of this phenomenon is that low water/binder ratios may permit closer packing and allow earlier inter-particle reaction at low hydraulic activity. Such a combination enhances the formation of a less porous and stronger matrix. The dispersion of the GGBS and/or PFA particles within a mix may then be more readily activated, thus accelerating hydration. Such synergistic action of CaO and the effect of the fluidifier results in the achievement of enhanced, practically-usable engineering properties of the resulting concrete. A low water to binder ratio may advantageously improve the properties of a resulting product such as a concrete.

When forming a concrete or a similar material, an aggregate is mixed with a cementitious binder and water. A cementitious binder may be pre-prepared from GGBS and/or PFA and an activator composition, and then mixed with the other components of the concrete. Alternatively, a cementitious binder may be formed in situ subject to thorough mixing. Thus, the CaO or activator composition embodying the invention may be added in the required proportion to a mixture containing GGBS and/or PFA. The activator composition and the GGBS and/or PFA would then combine in situ to form a cementitious binder phase that reacts with water to bind together the aggregates and any other components present in the system. As noted above, PFA may be used instead of GGBS, or mixtures of GGBS and PFA may be used.

It may be convenient for the CaO, or activator composition, to be pre-packaged in easily-handled packets or containers. Such packets or containers may be filled with a known weight of activator composition, such as 1 kg or 5 kg or 10 kg or 25 kg to ease the preparation of a binder for concrete or other material at the point of use.

When pre-packaged, it may be particularly advantageous for the activator composition to be contained within a water-soluble packaging. Thus, rather than weighing out the correct amount of activator composition each time a batch of concrete is prepared, a desired number of packets of activator composition may conveniently be added to the mixture during concrete preparation. The packets dissolve in the water added to the mix and the contents, i.e. the activator composition, then mix with other components of the system. Water-soluble containers may be formed from a water-soluble plastic, such as a polyvinyl-alcohol (PVA) or a paper-based material or other material which breaks up or disintegrates and disperses in the mixed binder.

The binder, comprising mixed activator composition and hydraulically-active material, may also be sold in pre-packaged quantities, such as in 1 kg or 5 kg or 10 kg or 25 kg bags or packages, or in larger packages such as 1 tonne. Alternatively, binder may be supplied in bulk, for example in a tanker.

Where the activator composition comprises two components, the first component of the activator composition (i.e. CaO) may be in the form of a powder. Other components of the activator composition (such as superplasticiser, or PCE, and microsilica and/or super-fine PFA if present) may also be in the form of a powder. The microsilica particle size is extremely fine, however, and is typically of the same order as tobacco-smoke particles. Thus, the handling of this material may be problematic and the supply of the activator composition in a sealed, water-soluble, packaging may help prevent problems associated with dusting of the microsilica.

The superplasticiser or PCE may be in the form of a liquid, in which case it may, if desired, not form part of the activator composition, but may be added separately.

This aspect of the invention may thus provide an activator composition in packaged form, preferably in the form of a water-soluble package of a predetermined weight of activator composition.

A second aspect of the invention may provide a method of making concretes, mortars, grouts or renders, comprising the steps of mixing together the following components in a predetermined proportion;
 a) ground granulated blastfurnace slag (GGBS) or PFA or mixtures of GGBS and PFA,
 b) an activator composition with or without superplasticiser or PCE (e.g. if this is in liquid form added separately),
 c) aggregate particles (or other matter suitable for the desired product), and
 d) water.

The activator composition is an activator composition according to the aspects of the invention described above, and may be CaO or may comprise CaO and other components. A weight ratio of the GGBS and/or PFA component and the activator composition component is at least (more than) 90:10, preferably with a higher weight proportion of the GGBS component. The GGBS and/or PFA and the activator composition combine in situ during mixing to form a cementitious binder as described above. This process is enhanced by the superplasticiser. The cementitious binder acts to bind the other ingredients to form the concretes, mortars, grouts, or renders.

Thus, the method requires a step of evaluating the weight of GGBS and/or PFA added to the mix and adding an appropriate quantity of activator composition and, if added separately, an appropriate quantity of superplasticiser or PCE. The actual weight of GGBS and/or PFA does not need to be weighed for every batch of material produced.

Alternatively, the GGBS and/or PFA and the activator composition may be mixed in the correct proportion to pre-form a cementitious binder prior to mixing with other components of the system.

Thus, a method of making a concrete, mortar, grout, or render, may comprise the steps of mixing together in a predetermined proportion;
 a) a cementitious binder
 b) aggregate particles (or other material),
 c) fluidifier (if present, for example if liquid PCE is added separately from or in addition to PCE in the activator composition), and
 d) water.

The cementitious binder is a cementitious binder as described above.

The ratio of the cementitious binder (whether formed in situ or not) to the aggregate phase is typically determined by measuring loose volumes of the components. This is a convenient measure as the proportions of the components can be easily determined by reference to volumes such as bucketfuls. Thus, volume ratio of the GGBS component to the aggregate particles component is typically between 1:3 and 1:15, preferably between 1:4 and 1:8. The preferred mixing ratios for different types of concretes and similar materials are well known.

The ratio of water to cementitious binder, assuming non-absorbent aggregates are used (the water demand when absorbent aggregates are used would have to be compensated for, as would be within the normal competence of the skilled person), is preferably between 0.15:1 and 0.45:1, preferably between 0.2:1 and 0.4:1, preferably between 0.25:1 and 0.35:1 for example about 0.3:1. This is the same as saying that the water proportion is between 0.15 and 0.45, for example between 0.2 and 0.4, or between 0.25 and 0.35, or about 0.3.

Mixing of the components may be carried out by standard means as used for normal OPC-based concretes and mortars. For example, if a concrete according to an aspect of the invention were being prepared on a building site it would be expected that a standard cement mixer would be used to mix the concrete.

As described above, there may be a number of advantages if the activator composition component is contained within one or more water-soluble packages and is released from the one or more water-soluble packages as the packages are dissolved by the water during mixing.

As in the preparation of standard OPC-based materials, the concrete composition may require the addition of further components. For example, glass fibres or polymer fibres may be added to improve the toughness of the final product. Dyes may be added to colour the final product. Thus, the method may further comprise the step of adding further components both inorganic or organic.

A third aspect of the invention may provide concretes, mortars, grouts, or renders comprising a cementitious binder or made using an activator composition as described above. Concretes, mortars, grouts or renders embodying the invention may also be provided produced by any method embodying the invention described herein.

One objective of the invention may be to achieve adequate resulting strengths in a concrete, grout, mortar or render, whilst achieving maximum environmental contribution by way of low carbon footprint. A cementitious binder having high GGBS and/or PFA content coupled with adequate stimulation to give a level of hydration, plus the optional role of the silica fume/super fine PFA with ultra-fluidifiers (superplasticisers), yields practical mechanical properties. A low level of activator composition increases the proportion of the cementitious binder that consists of GGBS, PFA or a mixture of the two, other suitable pozzolans.

Potentially the activator composition comprises the CaO (as a first component) and a second component consisting of microsilica or super fine pulverised fuel ash (PFA). Where present, the first component and the second component may be mixed in any weight ratio preferably, between 1.2:1 and 3:1. A superfluidifier, such as a PCE, may also form a component of the activator composition, particularly if in powder form.

In a fourth aspect, the invention may provide for use of an activator composition in combination with GGBS and/or PFA to form a cementitious binder, the activator composition comprising CaO, in which the proportion of the GGBS and/or PFA component by weight in the resulting binder is greater than 90% and the proportion of activator composition by weight in the resulting binder is less than 10%.

Preferably, the proportion of activator composition used is less than 8 wt % of the total weight of the cementitious binder, preferably less than 5 wt %, or less than 4 wt %, or less than 3 wt %, and/or greater than 0.5 wt %, 1 wt % or 1.5 wt %.

Such activator compositions can be used in combination with additional superplasticisers or PCEs, and/or with low concentrations of microsilica and/or pulverised fuel ash (ideally in super-fine form). The use of such an activator composition provides a cementitious binder comprising GGBS and/or PFA and a low concentration of CaO activator composition. A cementitious binder so formed may provide a workable mix with a low water to binder ratio.

In a fifth aspect, the invention may provide an activator composition for combining with GGBS and/or PFA to form a cementitious binder comprising a first component consisting of CaO, a second component consisting of a superplasticiser such as a PCE, and a third component consisting of microsilica and/or pulverised fuel ash (PFA). Preferably, any PFA, if present, is in the super-fine form. The first component and the third component are mixed in a weight ratio of between 1.2:1 and 3:1, or between 1.5:1 and 2.5:1, and particularly preferably about 2.1

It is preferred that the CaO has a high activity.

Preferably, the activator composition is used in combination with GGBS and/or PFA to form a cementitious binder component of a concrete, mortar, grout, or render.

In a sixth aspect, the invention may provide a cementitious binder comprising between 94-97 wt % ground granulated blastfurnace slag (GGBS), PFA, or mixed GGBS and PFA, and between 3-6 wt % of an activator composition as described above.

Preferably between 4-5 wt % of the activator composition is used particularly preferably about 4.5 wt %.

The low weight percentage of activator composition in the slag is surprising, as prior-art lime-activated GGBS cementitious binders would typically comprise at least 15 wt % lime, only rarely as low as 10 wt % lime. By using an activator composition according to the present invention, cementitious binders containing a high proportion of GGBS may be formed, while the initial set times remain within a range that may be deemed commercially acceptable, i.e. less than 18 hours at a temperature of about 20° C. Preferably the initial set times at 20° C. are less than 14 hours, preferably less than 12 hours or less than 10 hours. Particularly preferably the initial set times are less than 8 hours.

In one embodiment a cementitious binder may comprise between 94-97 wt % ground granulated blastfurnace slag (GGBS) and/or PFA, between 2-3.5 wt % CaO, and between 1-2.5 wt % microsilica and/or PFA preferably in the super-fine form. Particularly preferably the binder may comprise between 2.5-3.25 wt % CaO, and between 1.25-2 wt % microsilica. If the superplasticiser or PCE is in powder form the binder preferably contains more than 0.25% or 0.3% or 0.35% and less than 0.7% or 0.75% or 1% superplasticiser or PCE. If the superplasticiser or PCE is in liquid form a little more may be required, preferably between 0.5% and 2.0%

In one embodiment a cementitious binder may comprise between 94-97 wt % ground granulated blastfurnace slag (GGBS) and/or PFA and between 3-6 wt % of an activator composition, the activator composition comprising a first component consisting of CaO, and a second component consisting of microsilica and/or PFA, in which the first component and the second component are mixed in a weight ratio of between 1.2:1 and 3:1, preferably in a weight ratio of between 1.5:1 and 2.5:1, preferably about 2:1. The CaO may be any CaO described above. The CaO may be lime, as described above. A superplasticiser, such as PCE, may form a further component of the activator composition or be added separately.

In a seventh aspect of the invention, a method of making a concrete, mortar, grout or render, comprises the steps of mixing together the following components in a predetermined proportion;

a) ground granulated blastfurnace slag (GGBS),
b) an activator composition,
c) aggregate particles, or other component for making mortar, grout or render, and
d) water.

The activator composition is an activator composition according to any aspect of the invention as described above. The total weight of the activator composition component of the concrete, mortar, grout or render is between 3-6% of the total weight of the GGBS and/or PFA component of the concrete, mortar, grout or render.

In an eighth aspect of the invention, a concrete, mortar, grout or render comprises a cementitious binder formed from a combination of 94-97 wt % ground granulated blastfurnace slag (GGBS) and 3-6 wt % of an activator composition, and aggregate particles bound together by the binder. The activator composition comprises a first component consisting of CaO and a second component consisting of microsilica and/or PFA, the ratio of the first component to the second component being between 1.2:1 and 3:1. A superplasticiser, such as a PCE, may form a further component of the activator composition or be added separately.

The activator composition may be any activator composition as described above in relation to any aspect of the invention.

A concrete, mortar, grout or render according to the eighth aspect of the invention may comprise any cementitious binder as described above in relation to the invention.

Preferably, a concrete, mortar, grout or render according to any aspect of the invention does not comprise any OPC. Preferably, the weight ratio of water to binder is between 0.2:1 and 0.4:1, preferably between 0.25:1 and 0.35:1, and for example about 0.3:1 where non-absorbent aggregates are used. Low water content allows the formation of a material such as a concrete with good mechanical properties. It may be particularly advantageous to form a concrete comprising a cementitious binder as defined in any aspect above and a superfluidifier. The superfluidifier is preferably mixed with the CaO to form the activator composition, or is provided as a component of the activator composition. The superfluidifier allows a workable mix to be formed using a very low proportion of water, which may provide excellent set times and mechanical properties that would not be anticipated in a concrete that contains no OPC.

Preferably, a concrete, mortar, grout or render according to any aspect of the invention has a compressive strength of greater than 15 MPa after 7 days, or greater than 25 MPa after 7 days, for example greater than 28 MPa after 7 days, or greater than 30 MPa after 7 days, or greater than 32 MPa after 7 days.

Preferably, a concrete, mortar, grout or render according to any aspect of the invention has a compressive strength of greater than 20 MPa, or greater than 35 MPa after 14 days, for example greater than 38 MPa after 14 days, or greater than 40 MPa after 14 days, or greater than 42 MPa after 14 days.

Preferably, a concrete, mortar, grout or render according to any aspect of the invention has a compressive strength of greater than 30 MPa after 28 days, or greater than 40 MPa after 28 days, for example greater than 42 MPa after 28 days, or greater than 45 MPa after 28 days, or greater than 48 MPa after 28 days.

It is an aim of the present invention to provide activator compositions that enable the formation of concretes and similar materials using GGBS and/or PFA, and not using Portland cement. The cementitious binders described herein preferably do not comprise Portland cement. The concretes, mortars, grouts or renders described herein preferably do not contain any Portland cement.

A high GGBS-based material such as one of the concretes, mortars, grouts or renders as described herein may provide a number of advantageous properties over a similar material prepared using an OPC-based binder.

GGBS hydrates slowly when combined with water and has a significantly lower heat of hydration when compared with OPC-based binders. PFA has similar properties. A high heat of hydration can cause a setting concrete to expand and then contract, causing cracking. The high heat of hydration of OPC-based cements is a limiting factor in the volume of concrete that can be cast in one mix. Large areas of flooring, for example, must currently be cast in a number of separate sections. Cementitious binders comprising a high proportion of GGBS and activated by a low proportion of CaO, have a low heat of hydration. Cementitious binders embodying the present invention may advantageously allow a concrete to be formed without OPC-based binders, which therefore has a modified heat of hydration. This property, in combination with a reasonably-fast setting time (as exemplified below) may allow the production of large volumes or areas of concrete in a single section. Thus, a concrete produced using the teaching of any aspect of the invention described herein may advantageously be used in the production of flooring.

It is generally known that the permeability of concretes decreases as the proportion of GGBS increases. By allowing a high proportion of GGBS to be used, the invention may allow the production of water-resistant concretes, mortars, grouts and renders. Furthermore, the inclusion of a proportion of microsilica or super fine PFA in the activator composition may further improve the water permeability (i.e. reduce the water permeability) compared with OPC-based concretes.

A material formed according to the teaching of this invention may have a considerably-improved resistance to certain chemicals compared with OPC-based materials. This effect may be partially due to a higher proportion of GGBS in the binder, and may also be partially due to the interaction of the components in the activator composition. Thus, the materials, such as concretes, formed according to the invention may be suitable for use in hostile environments, such as marine environments.

For reasons explained in the background to the invention above, a material formed without using OPC has a lower carbon footprint than a material that does use OPC. Thus, a material formed using the teaching of this invention may be classed as a "green" material, or an environmentally friendly material.

Embodiments of the invention may relate to a wide variety of types of concrete, including screeds, for example.

GGBS is an example of a latently hydraulically-active material. Cementitious binders and concretes, mortars, renders and grouts may be produced using other hydraulically-active materials to replace a proportion or all of the GGBS component, with the proviso that ordinary Portland cement is not used. For example, a proportion of a GGBS component as described in relation to any aspect, embodiment, or statement of invention herein may be replaced by a proportion of one or more other hydraulically-active materials that are not Portland cement.

DESCRIPTION OF SPECIFIC EMBODIMENTS OF THE INVENTION

Specific embodiments according to one or more aspects of the invention will now be described by way of example.

EXPERIMENTAL METHODS

Unless otherwise specified, in the following Examples a cementitious binder was prepared by mixing GGBS with activator compositions or components consisting of or comprising CaO. The cementitious binder was then mixed with aggregates. After a brief pre-mixing period, 80% of the mixing water was added, which was followed by the addition of a fluidifier (dispersant, or superplasticiser) together with the rest of the mixing water. The entire blend was thoroughly mixed for 10 minutes after which it was placed in appropriate moulds with the aid of vibration.

Samples for strength testing were left to cure in air for 24 hours and then under water until tested. Samples for shrinkage testing were left in air for 24 hours and then de-moulded.

Tests were performed in accordance with the following standards (BS=British Standard).

Slump—BS EN 12350-2:2009
Setting time—BS EN 13294:2002
Strength—BS EN 12390-3:2009
Drying shrinkage/wetting expansion—BS EN 12617-4:2002

Example 1

A cementitious binder was prepared having a composition defined by the following weight ratio: GGBS 95%, CaO 3%, Microsilica 2%. The specific weights of these components were: GGBS (2.57 kg), CaO (0.08 kg), Microsilica (0.05 kg).

The GGBS was supplied by Hanson Ltd. This is a blastfurnace slag principally comprising the oxides of calcium, silicon, aluminium, and magnesium. This GGBS has been ground to a specific surface area of approximately 500 m$^2$/kg, and the powder has a bulk density of 1000-1300 kg/m$^3$. The mean particle size is 5-30 micrometers and the particle density is 2750-3000 kg/m$^3$.

The microsilica used has the trade name SILACEM®, and is a silica fume having an average particle size of between 0.13 and 0.16 micrometers.

To form a concrete, the following components were mixed;

2.69 kg of the cementitious binder described above;

27 ml Sika ViscoCrete10® (a liquid PCE superplasticiser added as a component of the binder);

1.5 kg Ardleigh stone;

5.6 kg Granite;

5.1 kg Sand;

0.81 l tap water.

The components were mixed completely and cast.

The resulting concrete had a strength of 41 MPa at 14 days, and 44 MPa at 28 days.

Example 2

Mix design (per 15 kg batch of solids)

Binder: GGBS 94.6%+CaO 2.6%+PFA super fine 1.8%+PCE 1%

The weights used were GGBS (2.57 kg), CaO (0.07 kg), PFA super-fine (0.05 kg), 27 ml Sika ViscoCrete10® (a liquid PCE superplasticiser added as a component of the binder); the solid components of the binder were mixed and then the PCE mixed 1:100 with the remainder of the binder (i.e. 1 wt %)

Aggregates: Ardleigh stone (1.5 kg), Granite (5.6 kg), Sand (5.1 kg)

Water: tap water (0.81 L, water/binder ratio=0.3)

Slump: 40 mm

Setting time: 6 hrs initial, 9 hrs final 7 days compressive strength: 37 MPa 14 days compressive strength: 40 MPa 28 days compressive strength: 46 Mpa Example 3

Mix design (per 15 kg batch of solids)

Binder: GGBS 96.4%+CaO 2.6%+superplasticiser 1%.

The weights used were GGBS (2.63 kg), CaO (0.07 kg), 27 ml Sika ViscoCrete10® (a liquid PCE superplasticiser as a component of the binder). The PCE was mixed 1:100 with the remainder of the binder (i.e. 1 wt %)

Aggregates: Ardleigh stone (1.5 kg), Granite (5.6 kg), Sand (5.1 kg)

Water: tap water (0.81 L, water/binder ratio=0.3)

Slump: 40 mm 14 days compressive strength: 38 MPa 28 days compressive strength: 42 MPa Drying shrinkage characteristics: 400-600 micro strains (OPC control 600 micro strains)

Example 4

Mix design (per 15 kg batch of solids)

Binder: GGBS 94.6%+CaO 2.6%+Undensified microsilica 1.8%+superplasticiser 1%.

The weights used were GGBS (2.57 kg), CaO (0.07 kg), undensified microsilica (0.05 kg), 27 ml Sika ViscoCrete10® (a liquid PCE superplasticiser as a component of the binder). The solid components of the binder were mixed and then the PCE mixed 1:100 with the remainder of the binder (i.e. 1 wt %)

Aggregates: Ardleigh stone (1.5 kg), Granite (5.6 kg), Sand (5.1 kg)

Water: tap water (0.81 L, water/binder ratio=0.3)

Slump: 40 mm 14 days compressive strength: 41 MPa 28 days compressive strength: 44 MPa Drying shrinkage characteristics: 400-600 micro strains (OPC control 600 micro strains)

Example 5

GGBS 98.9%, CaO 0.1% PCE 1%

Mix design (per 15 kg batch of solids)

Binder: GGBS (2.697 kg), CaO (0.003 kg), 27 ml Sika ViscoCrete10® (a liquid PCE superplasticiser as a component of the binder). The PCE was mixed 1:100 with the remainder of the binder (i.e. 1 wt %)

Aggregates: Ardleigh stone (1.5 kg), Granite (5.6 kg), Sand (5.1 kg)

Water: tap water (0.81 L, water/binder ratio=0.3)

Slump: 160 mm 7 days compressive strength: 3.1 MPa 28 days compressive strength: 23.8 MPa Example 6

GGBS 98.5%, CaO 0.5%, PCE 1%

Mix design (per 15 kg batch of solids)

Binder: GGBS (2.687 kg), CaO (0.013 kg), 27 ml Sika ViscoCrete10® (a liquid PCE superplasticiser as a component of the binder). The PCE was mixed 1:100 with the remainder of the binder (i.e. 1 wt %)

Aggregates: Ardleigh stone (1.5 kg), Granite (5.6 kg), Sand (5.1 kg)

Water: tap water (0.81 L, water/binder ratio=0.3)

Slump: 175 mm 7 days compressive strength: 19.1 MPa 28 days compressive strength: 29 MPa Example 7

Mix design (per 15 kg batch of solids)

Binder: GGBS 94.3%+CaO 2.9%+PFA super fine 1.8%+superplasticiser 1%.

The weights used were GGBS (2.57 kg), CaO (0.08 kg), PFA super fine (0.05 kg), 27 ml Sika ViscoCrete10® (a liquid PCE superplasticiser as a component of the binder). The PCE was mixed 1:100 with the remainder of the binder (i.e. 1 wt %)

Aggregates: Sand (4.8 kg), Gravel 10 mm (2.3 kg), Gravel 20 mm (5.3 kg)

Water: tap water (1.13 L, water/binder ratio=0.4)

Slump: 60 mm 7 days compressive strength: 25 MPa 28 days compressive strength: 35.4 MPa

Example 8

Mix design (per 15 kg batch of solids)
Binder: GGBS 94.3%+CaO 2.9%+PFA super fine 1.8%+superplasticiser 1%
GGBS (2.57 kg), CaO (0.08 kg), PFA super fine (0.05 kg), superplasticiser: BASF RheoMatrix 233®—27 g mixed 1:100 with the remainder of the binder.
Aggregates: Sand (4.8 kg), Gravel 10 mm (2.3 kg), Gravel 20 mm (5.3 kg)
Water: tap water (0.89 L, water/binder ratio=0.33)
Slump: 70 mm
7 days compressive strength: 33.1 MPa
28 days compressive strength: 42.2 MPa

Example 9

Mix design (per 15 kg batch of solids)
Binder: GGBS 94.8%+CaO 2.9%+PFA super fine 1.8%+superplasticiser 0.5%
GGBS (2.57 kg), CaO (0.08 kg), PFA super fine (0.05 kg), superplasticiser: MELFLUX 2651F®—powder 13.5 g.
The CaO, super-fine PFA and superplasticiser were mixed to form an activator composition, which was then mixed with the GGBS.
Aggregates: Sand (4.8 kg), Gravel 10 mm (2.3 kg), Gravel 20 mm (5.3 kg)
Water: tap water (0.89 L, water/binder ratio=0.33)
Slump: 100 mm
7 days compressive strength: 28 MPa
28 days compressive strength: 44.7 MPa

Example 10

Mix design (per 15 kg batch of solids)
Binder: GGBS 94.8%+CaO 2.9%+PFA super fine 1.8%+superplasticiser 0.5%
GGBS (2.57 kg), CaO (0.08 kg), PFA super fine (0.05 kg), superplasticiser: Sika VC225—powder 13.5 g mixed 1:200 with the remainder of the binder (i.e. 0.5 wt %)
The CaO, super-fine PFA and superplasticiser were mixed to form an activator composition, which was then mixed with the GGBS.
Aggregates: Sand (4.8 kg), Gravel 10 mm (2.3 kg), Gravel 20 mm (5.3 kg)
Water: tap water (0.89 L, water/binder ratio=0.33)
Slump: 90 mm
7 days compressive strength: 29.5 MPa
28 days compressive strength: 44.5 MPa

Example 11

Mix design (per 15 kg batch of solids)
Binder: GGBS 84.4%+PFA (BS EN 450) 9.9%+CaO 2.9%+PFA super fine 1.8%+superplasticiser 1%
GGBS (2.30 kg), PFA BS EN 450 (0.27)+CaO (0.08 kg), PFA super fine (0.05 kg), 27 ml Sika ViscoCrete10® (a liquid PCE superplasticiser as a component of the binder). The PCE was mixed 1:100 with the remainder of the binder (i.e. 1 wt %)
Aggregates: Sand (4.8 kg), Gravel 10 mm (2.3 kg), Gravel 20 mm (5.3 kg)
Water: tap water (1.13 L, water/binder ratio=0.4)
Slump: 80 mm
7 days compressive strength: 13.2 MPa
28 days compressive strength: 23 MPa

Example 12

Mix design (per 15 kg batch of solids)
Binder: GGBS 54.7%+PFA (BS EN 450) 39.6%+CaO 2.9%+PFA super fine 1.8%+superplasticiser 1%
GGBS (1.49 kg), PFA BS EN 450 (1.08 kg)+CaO (0.08 kg), PFA super fine (0.05 kg), 27 ml Sika ViscoCrete10® (a liquid PCE superplasticiser as a component of the binder). The PCE was mixed 1:100 with the remainder of the binder (i.e. 1 wt %)
Aggregates: Sand (4.8 kg), Gravel 10 mm (2.3 kg), Gravel 20 mm (5.3 kg)
Water: tap water (1.13 L, water/binder ratio=0.4)
Slump: 90 mm
7 days compressive strength: 36.2 MPa
28 days compressive strength: 50.0 MPa

Example 13

Mix design (per 15 kg batch of solids)
Binder: GGBS 44.8%+PFA (BS EN 450) 49.5%+CaO 2.9%+PFA super fine 1.8%+superplasticiser 1%
GGBS (1.22 kg), PFA BS EN 450 (1.35)+CaO (0.08 kg), PFA super fine (0.05 kg), 27 ml Sika ViscoCrete10® (a liquid PCE superplasticiser as a component of the binder). The PCE is mixed 1:100 with the remainder of the binder (i.e. 1 wt %)
Aggregates: Sand (4.8 kg), Gravel 10 mm (2.3 kg), Gravel 20 mm (5.3 kg)
Water: tap water (1.13 L, water/binder ratio=0.4)
Slump: 80 mm
7 days compressive strength: 33.6 MPa
28 days compressive strength: 49.6 MPa

Example 14

Mix design (per 15 kg batch of solids)
Binder: GGBS 24.9%+PFA (BS EN 450) 69.4%+CaO 2.9%+PFA super fine 1.8%+superplasticiser 1%
GGBS (0.68 kg), PFA BS EN 450 (1.89)+CaO (0.08 kg), PFA super fine (0.05 kg), 27 ml Sika ViscoCrete10® (a liquid PCE superplasticiser as a component of the binder). The PCE was mixed 1:100 with the remainder of the binder (i.e. 1 wt %)
Aggregates: Sand (4.8 kg), Gravel 10 mm (2.3 kg), Gravel 20 mm (5.3 kg)
Water: tap water (1.13 L, water/binder ratio=0.4)
Slump: 110 mm
7 days compressive strength: 29.9 MPa
28 days compressive strength: 48.1 MPa

Example 15

Mix design (per 15 kg batch of solids)
Binder: Binder: PFA (BS EN 450) 94.3%+CaO 2.9%+PFA super fine 1.8%+superplasticiser 1%
PFA BS EN 450 (2.57)+CaO (0.08 kg), PFA super fine (0.05 kg), 27 ml Sika ViscoCrete10® (a liquid PCE superplasticiser as a component of the binder). The PCE was mixed 1:100 with the remainder of the binder (i.e. 1 wt %)
Aggregates: Sand (4.8 kg), Gravel 10 mm (2.3 kg), Gravel 20 mm (5.3 kg)
Water: tap water (1.13 L, water/binder ratio=0.4)
Slump: 90 mm
7 days compressive strength: 16.9 MPa
28 days compressive strength: 29.9 MPa

The invention claimed is:

1. A cementitious binder consisting of at least 90% by weight of a non-Ordinary Portland Cement (non-OPC) pozzolanic hydraulically-active material comprising ground granulated blast furnace slag (GGBS), pulverised fuel ash (PFA) or a mixture of GGBS and PFA, at least 0.1% and less than 9.5% by weight of an activator, which is CaO or lime, and a superplasticiser.

2. A cementitious binder according to claim 1, in which the superplasticiser is a polycarboxylate-ether-based (PCE) superplasticiser.

3. A cementitious binder according to claim 1, which consists of GGBS, PFA or the mixture of GGBS and PFA, the CaO or lime and the superplasticiser.

4. A cementitious binder according to claim 1, comprising at least 1 wt % CaO or lime.

5. A cementitious binder according to claim 1, comprising greater than 93% by weight hydraulically-active material.

6. A cementitious binder according to claim 1, comprising between 0.2% and 2% by weight superplasticiser.

7. A cementitious binder according to claim 1, in which the superplasticiser is in powder form and the binder comprises more than 0.3% by weight and 1.2% by weight superplasticiser.

8. A cementitious binder according to claim 1, in which the superplasticiser is in liquid form and the binder comprises more than 0.2% by weight and less than 2% by weight superplasticiser.

9. A concrete, mortar, grout or render comprising a cementitious binder as defined in claim 1.

10. A concrete, mortar, grout, or render according to claim 9, in which the weight ratio of water to binder is between 0.2:1 and 0.4:1.

11. A concrete, mortar, grout or render according to claim 9, which has a compressive strength of greater than 15 MPa after 7 days, and greater than 20 MPa after 14 days, and greater than 30 MPa after 28 days.

12. A cementitious binder comprising;

between 94 and 97% by weight of a hydraulically-active material comprising ground granulated blast furnace slag (GGBS), pulverised fuel ash (PFA), or a mixture of GGBS and PFA;

between 1.5% and 3.5% by weight CaO or lime; and between 0.2% and 2% by weight superplasticiser.

13. A cementitious binder according to claim 12, comprising between 1-2.5 wt % microsilica and/or PFA.

14. A concrete, mortar, grout or render comprising a cementitious binder according to claim 12.

15. A cementitious binder according to claim 12, in which the superplasticiser is a polycarboxylate-ether-based (PCE) superplasticiser.

* * * * *

UNITED STATES PATENT AND TRADEMARK OFFICE
CERTIFICATE OF CORRECTION

PATENT NO. : 10,399,897 B2
APPLICATION NO. : 14/404541
DATED : September 3, 2019
INVENTOR(S) : David Martin James Ball, Martin Liska and Peter Hewlett Page 1 of 1

It is certified that error appears in the above-identified patent and that said Letters Patent is hereby corrected as shown below:

On the Title Page

Item (73), The assignee name and residence data to be printed is shown below:
DB GROUP (HOLDINGS) LTD
Cambridge, Cambridgeshire, Great Britain Signed and Sealed this
Tenth Day of March, 2020

Andrei Iancu
*Director of the United States Patent and Trademark Office*